United States Patent [19]

Bettcher

[11] 4,216,566

[45] Aug. 12, 1980

[54] TENDERIZER

[75] Inventor: Louis A. Bettcher, Amherst, Ohio

[73] Assignee: Bettcher Industries, Inc., Birmingham, Ohio

[21] Appl. No.: 917,317

[22] Filed: Jun. 19, 1978

[51] Int. Cl.² .............................................. A22C 9/00
[52] U.S. Cl. ........................................ 17/25; 83/131;
83/133; 83/141; 83/564
[58] Field of Search ................. 17/25, 28, 11; 83/131, 83/133, 83/141, 564

[56] References Cited

U.S. PATENT DOCUMENTS

| 680,674 | 8/1901 | Franck | 83/564 |
| 3,619,883 | 11/1971 | Venables | 83/564 X |
| 3,971,088 | 7/1976 | Osiadacz | 17/25 |
| 4,027,356 | 6/1977 | Wagner et al. | 17/25 |

Primary Examiner—Z. R. Bilinsky
Attorney, Agent, or Firm—Watts, Hoffmann, Fisher & Heinke Co.

[57] ABSTRACT

An apparatus for tenderizing a comestible product, such as meat, comprising an intermittently advanced horizontal conveyor for conveying a product to be processed underneath a set of knives in a knife carriage supported for vertical reciprocation toward and away from the conveyor. The knife carriage has a plurality horizontal plate-like members fixed in vertical spaced relative to one another and discrete knife assemblies each comprising a rod-like member slidable in closely spaced vertically aligned apertures of upper plate-like members and extending to opposite sides thereof. The rod-like members each have a flange at the upper side of an intermediate plate-like member normally engaging the same. A discrete compression spring surrounding each of the rod-like members is interposed between the flange thereon and the under side of an upper plate-like member which is adjustable towards and from the intermediate plate-like member. A plurality of tenderizing blades or knives are connected to the lower ends of each rod-like member and extend through individual apertures in a lower plate-like member. A product stripper plate is arranged to move downwardly and upwardly in timed relation with like movements of the knife carriage and to rest upon the upper surface of the product during piercing thereof by the tenderizing knives and to be locked in said position while the knives are withdrawn from the product. The knife carriage is movable to a horizontal position for ready accessability to the knife assemblies etc. for servicing, such as, replacement etc.

3 Claims, 4 Drawing Figures

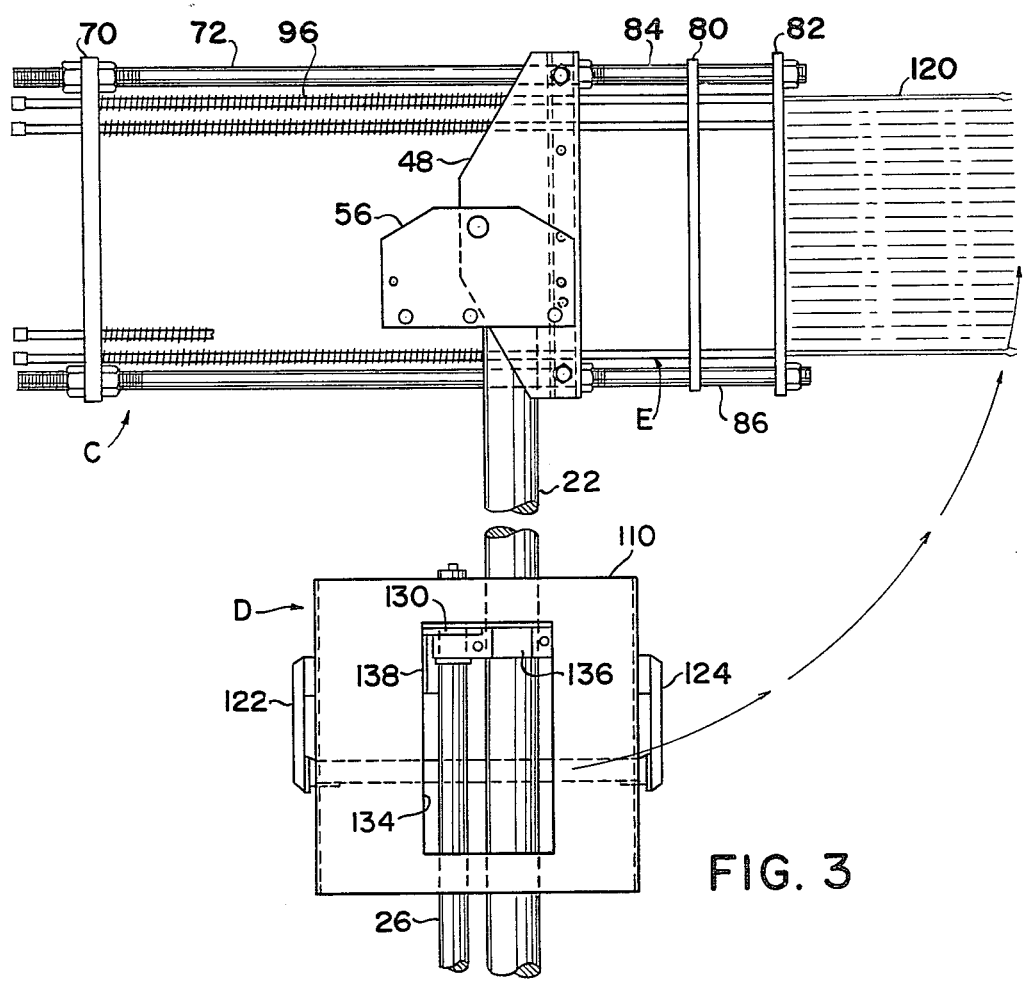
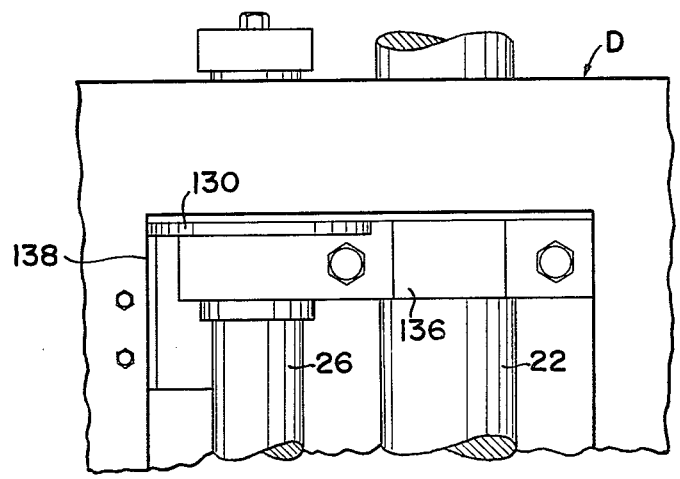

TENDERIZER

BACKGROUND OF THE INVENTION

1. Field of the Invention

The invention relates to apparatus for tenderizing comestible products, such as, for example, meat, by piercing and/or cutting the product from one side simultaneously by a multiplicity of thin needles or knives.

2. Description of the Prior Art

A number of machines for tenderizing and/or injecting fluid in pieces or cuts of meat with and/or without bone employing a multiplicity of closely arranged knives or needles with solid and hollow for simultaneously cutting or piercing a meat product are known. The knives or needles of such machines are not readily accessible for repair, replacement, etc.

SUMMARY OF THE INVENTION

The present invention provides a novel and improved apparatus for treating or processing a comestible product, such as, meat, with or without bone therein, utilizing a plurality of vertically reciprocable thin knives or needles for simultaneously producing a multiplicity of small openings in the comestible product in which parts of the apparatus, including the knives or other piercing instrumentalities, are readily accessible for maintenance, replacement, cleaning, etc.

The invention more specifically provides a novel and improved apparatus for tenderizing a comestible product, comprising an intermittently advanced horizontal conveyor for conveying a product to be processed underneath a set of knives in a knife carrier or carriage supported for reciprocation toward and away from the conveyor in which the knife carrier or carriage is movable to a horizontal position to facilitate maintenance, replacement, cleaning, etc. of parts thereof.

Further objects and advantages of the invention will be apparent from and/or will be referred to in the following description of the preferred embodiment of the invention.

BRIEF DESCRIPTION OF THE DRAWINGS

FIG. 3 is a fragmentary enlarged view of a portion of FIG. 1 showing some of the parts in a different position; and FIG. 4 is a fragmentary view of a portion of FIG. 1.

DESCRIPTION OF THE PREFERRED EMBODIMENT

The depicted apparatus comprises a cabinet base A upon the top of which is supported an endless product conveyor B the upper reach of which is intermittently movable to convey a product to be tenderized underneath a plurality of knives 20 in a vertically reciprocable knife carrier or carriage C. The conveyor B is operated to advance a product being tenderized in timed relation to the reciprocation of the knife carriage C. A hold-down carrier or carriage D is also provided for reciprocation towards and from the conveyor B in timed relation to the reciprocation of the knife carriage. The knife carriage is connected to the upper ends of vertically reciprocable shaft-like members 22,24 at opposite sides of the conveyor B and extending through the top of the cabinet A. The members 22 and 24 are reciprocated by an electric motor driven crank mechanism within the cabinet A the construction of which mechanism forms no part of the present invention and is not herein shown and described. The hold-down carriage D is slidably supported on rod-like members 26,28 at opposite sides of the conveyor B and extending upwardly from the top of the cabinet A parallel with the members 22,24. The hold-down carriage D is moved downwardly by gravity along with the knife carriage as the knife carriage descends to tenderize a product until a hold-down or stripper plate 30 forming a part of the hold-down or stripper carriage rests upon a product to be tenderized. As the knife carriage continues its downward movement the hold-down carriage is locked in position with the hold-down or stripper plate 30 against the top of the product until released during upward movement of the knife carriage upon completion of the tenderizing operation. After the tenderizing knives 20 are withdrawn from the product the hold-down carriage C is released and carried upwardly by the knife carriage C to their starting or up position.

Figure 1:
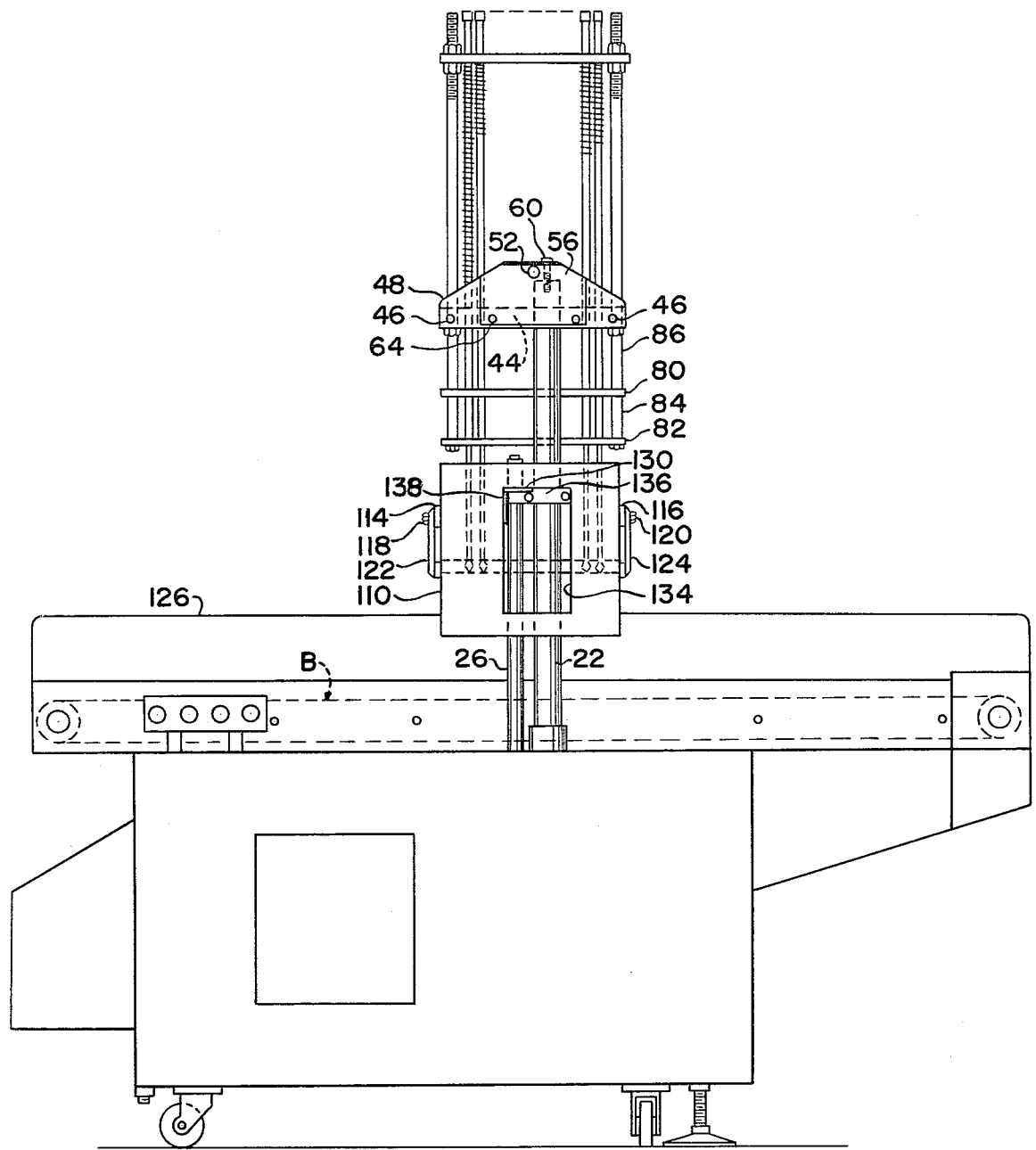
FIG. 1 is a side elevational view of a meat tenderizing apparatus embodying the present invention employing a multiplicity of knives for simultaneously producing a plurality of small incisions in a meat product with or without bone therein.

The product conveyor B encircles a drive shaft 36 at the right hand end of the apparatus, as viewed in FIG. 1, and an idler shaft at the opposite end of the apparatus. The shaft 36 is intermittently rotated by a sprocket chain drive 38 driven by suitable mechanism preferably an independent electric motor or other prime mover so that the conveyor B can be operated independent of other parts of the apparatus.

The knife carriage C comprises a horizontal plate 44 opposite end of which are connected by counter-sunk head screws 46 to members 48, 50 pivotally connected by counter-sunk head screws 52, 54 to members 56, 58, respectively, projecting into suitable apertures in the lower sides of the member 56, 58 and within which apertures the upper ends of the shafts are fixed by screws 60, 62, respectively. The members 48, 50 are normally each fixed to the members 56, 58, respectively, by a plurality of bolts 64, 66 extending through suitable apertures in members 56, 58 and threaded into tapped apertures in members 48, 50. In addition to the plate 44 the knife carriage C includes an upper horizontal plate 70 connected to plate 44 by a plurality of rod members 72 and adjustable relative to plate 44 by jam nuts 74,76 threaded onto the upper ends of members 72 and engaging opposite sides of the plate 70. Further horizontal plates 80, 82 spaced vertically with respect to one another and below the plate 44 distances, preferably equal to about one half the lengths of the knives 20, by four pairs of tubular members 84,86 are connected to one another and to the plate 44 by four rod members 88 projecting through the plates 44, 80, 82 near the corners thereof and the tubular spacing member 84,86 interposed between plates 44, 80 and 80, 82, respectively.

Plates 44, 80,82 have closely spaced aligned apertures therethrough forming a multiplicity of series of closely spaced apertures within each of which a tubular rod member 90 forming a part of a knife assembly designated generally by the reference character E is slidably supported. Each of the rod members 90 has a pair of knives 20 detachably connected to its lower end. The members 90 fit loosely within their supporting apertures in plates 44, 70, 80 but without undue play. The apertures in the plate members 44, 70, 80 through which the members 90 extend are provided with plastic bushings. Each of the members 90 has fixed thereto intermediate its ends a collar 92 that normally engages the upper surface of the plate 44 or the bushing therein through which the member 90 extends which collar member limits the downward movement of the members 90 and in turn the knife assemblies E of which it is a part relative to the plate 44.

Each member 90 is biased in a downwardly direction by a preloaded coil type compression spring 96 surrounding the member and interposed between the underside of the plate 70 or the bushing therein surrounding the member and the collar 92 thereon. The springs 96 limits the force which can be applied by the individual knives or pairs of knives 20 to a product being tenderized. Jam nuts located above and below the plate 70 provides an adjustment of the plate 20 to and from the plate 44 to vary the preloaded and/or bias of the springs 96. The preload or bias of individual springs can be adjusted by shims interposed between the upper and/or lower ends of the springs and the members against which they otherwise abut. In place of the springs 96 other known overload limiting and/or release devices having like or different operating characteristics may be used to limit or release altogether the force applied to a product being tenderized by the tenderizing knives.

The two tenderizing knives 20 of each assemblies E are connected to the lower end of the member 90 and extend downwardly through individual openings in the plates 30, 82 which openings are in alignment with the openings in the plates 44, 70, 80. The knives 20 shown have long small diameter cylindrical shank and relatively wide flat thin spear-like blades provided with cutting edges along the entire length of their two sides.

The hold-down or stripper carriage D comprises two fabricated members 110,112 slidably supported on the movable shaft members 22,24 and the fixed rod members 26, 28. The members 110, 112 are connected to one another by cross members 114,116 at left and right hand sides of the apparatus as viewed in FIG. 1. The members 114,116 are connected to the members 110,112 by bolts 118,120 so that they can be detached therefrom. The hold-down and stripper plate 30 is suspended from the members 114,116 by vertical plate like members 122,124, respectively, of which there are three (3) on either side. The suspension of the member 30 from the members 114,116 allows the members 30 to descend between the product guides 126,128 at opposite sides of the conveyor B and rest upon a product therebetween if the product is of less height than the guides 126,128.

Mechanism is provided for locking the stripper carriage D against movement in the upwardly direction when the product hold-down plate 30 has come to rest upon a product to be tenderized until the tenderizing knives have been withdrawn from the product. Mechanism of this character is well known. The mechanism emloyed in the depicted apparatus comprises a member 130 at each side of the apparatus and through which the members 26,28 extend. The members 130 are slidably supported on the rods 26,28 between the undersides of the tops of rectangular openings 134 in the members 110,112 and members 136 adjustably connected to the members 22,24 below the undersides of the tops of the openings 134. The members 130 are normally held in a horizontal positions so that they can slide freely on the rod-like members 26,28 by parts of the members 136 which surround the members 26,28 and plate-like members 138 connected to the side of the rectangular openings 134 which are adjacent to the rod-like members 26,28. The undersides of the outer edges of the members 130, which edges project beyond the members 136 associated therewith, engage and rest upon the upper surfaces of the member 138 associated therewith. When the product hold-down plate 30 comes to rest upon a product being tenderized continued downward movement of the knife carriage moves the members 136 away from the members 130 allowing them to tilt about the members 138 and jam against the members 26,28 and thus lock the hold-down carriage against movement in the upwardly direction. In addition to holding the members 130 in the horizontal position except when the hold-down plate 30 is resting upon a product being tenderized the members 136 also engage the top of the rectangular openings 134 in the members 110,112 of the hold-down carriage except when the hold-down plate 30 is resting upon a product being tenderized and thus control the vertical movement of the hold-down carriage.

As the knife carriage C begins its downward movement with a product to be tenderized therebeneath the hold-down carriage D moves down by gravity with the knife carriage until the hold-down plates 30 engage the top of the product to be tenderized. Continued downward movement of the knife carriage disengages the members 136 from the members 130 allowing them to pivot about the members 138 and jam against the rod-like members 26,28 with which they are associated to prevent subsequent upward movement of the hold-down carriage and thus maintain the hold-down plate 30 in engagement with the top of the product being tenderized. As the knife carriage reaches the position upon its return movement at which the ends of the tenderizing blades are withdrawn from the tenderized product and into the hold-down plate 30 the members 136 on the members 22,24 re-engage the members 130 and move them to their horizontal positions which they occupied at the beginning of the tenderizing operation. Continued upward movement of the knife carriage C lifts the hold-down carriage D with it until both carriages reach their up position which is the position shown in the drawings.

In order to obtain optimum balance of the movable carriages C, D utilizing the minimum parts shown for supporting and moving the same the members 22, 26 at one side of the apparatus are aligned parallel to the one side of the conveyor B and the members 24, 28 to the other side of the conveyor with the members at opposite sides of the apparatus reversed with respect to the direction of travel of the conveyor.

Figure 2:
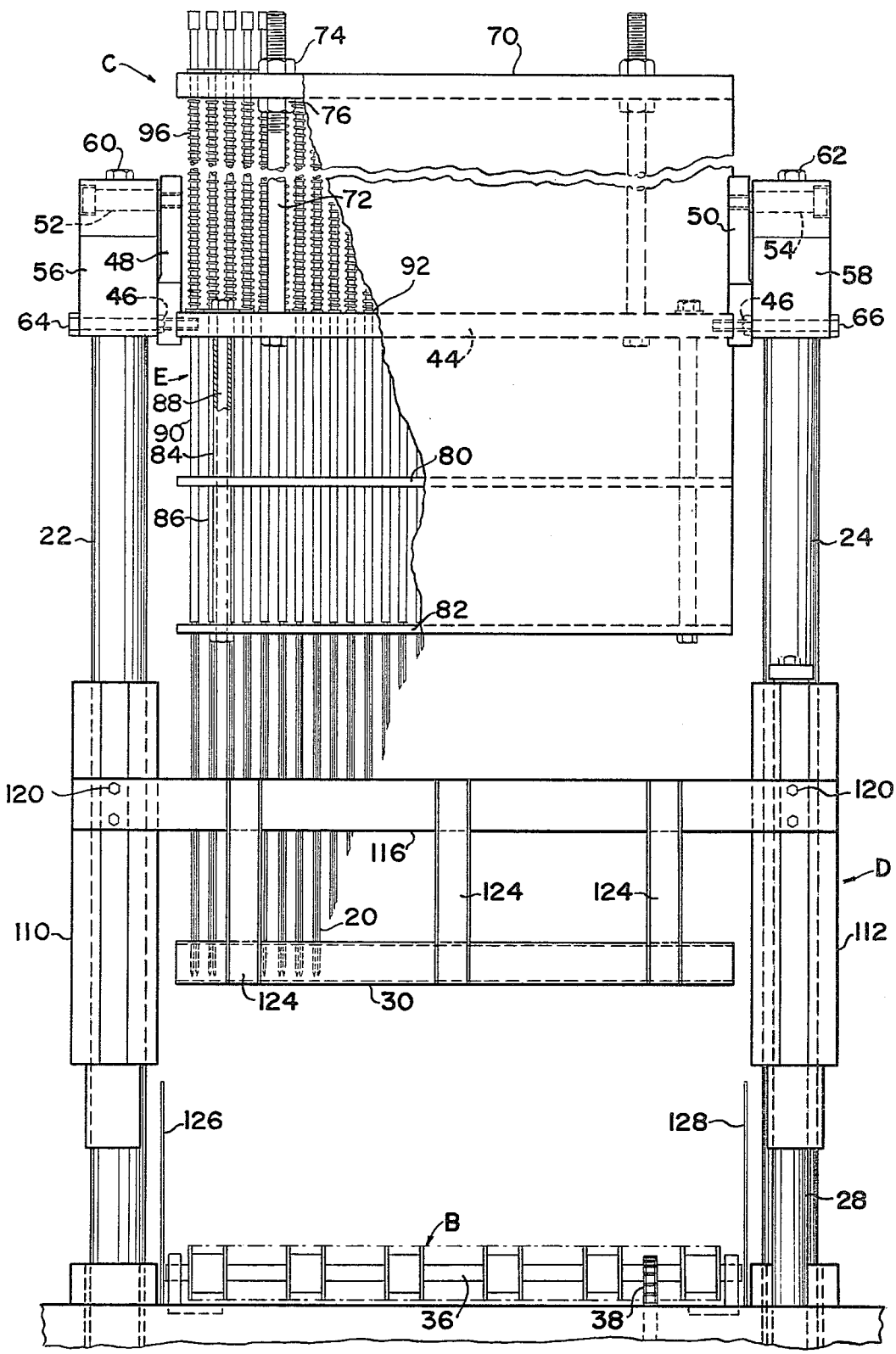
FIG. 2 is a fragmentary elevational view of the apparatus as viewed from the right-hand of FIG. 1.

The overall height of apparatus of the character to which the invention relates is normally from about two meters (2.0 m.) to three meters (3.0 m.) and may be more which make it difficult or inconvenient to service the knife carriage, for example, replace one of the knife assemblies. With the present invention servicing can be readily performed by the operative pivoting the knife carriage into a horizontal position, as shown, in FIG. 2. To do this with the depicted apparatus the operative first removes the bolts 118,120 and lowers the members 114,116 and the plate 30 to a position on the conveyor B or the side guides 126,128. In this position, the parts of the hold-down carriage mentioned are below the lower ends of the blades 20 of the knife carriage. The two bolts 64 and 66 which with the bolts 52, 54 at the respective sides of the apparatus form an isosceles triangle with the two bolts 64 and 66 located 90° apart are then removed and the knife carriage C rotated 90° in either direction, for example, to the position shown in FIG. 3, whereupon one of the bolts 64, 66 at the respective sides are reinserted in appropriate apertures in the parts 48,50 and 56,58, respectively, to hold the knife carriage in the horizontal position during servicing of the carriage.

From the foregoing description of the preferred embodiment of the invention it will be apparent that the objects heretofore enumerated and others have been accomplished and that there has been provided a novel and improved apparatus for processing a comestible product utilizing reciprocable knives, or the like, for producing a multiplicity of small openings in the product and having the knives or other piercing instrumentalities readily accessible for maintenance, replacement, etc.

While the preferred embodiment of the invention has been illustrated and described in considerable detail it is to be understood that the depicted apparatus is merely illustrative of the invention and that the invention is not limited thereto. It is the intention to hereby cover all adaptations, modifications and uses of the apparatus illustrated and described herein which come within the practice of the art to which the invention relates and the scope of the appended claims.

What is claimed is:

1. An apparatus for tenderizing a comestible product, such as, meat comprising; an intermittently advanced horizontal conveyor for supporting and conveying thereon a product to be tenderized; vertically movable carriage support members at opposite sides of said conveyor; a first carriage above said conveyor and having a multiplicity of closely spaced aligned apertures with rod-like member having a long thin product piercing instrumentality connected to its one end slidable in each of a plurality of the aligned apertures and operatively connected to the carriage by overload release means; means for selectively connecting said first carriage to said carriage support members in one of different angular positions about a horizontal axis above said conveyor and extending transversely thereof; power means for reciprocating said carriage support members to cause said instrumentalities to pierce a product on said conveyor; a second carriage arranged to move in coordination with movements of said first carriage; a member overlying said conveyor and detachably connected to said second carriage to engage a product being pierced by said instrumentalities,; and means for locking said second carriage in position with said member connected thereto engaged with the product while said instrumentalities are being withdrawn from a product.

2. An apparatus for tenderizing a comestible product such as, meat comprising: an intermittently advanced horizontal conveyor for supporting and conveying thereon a product to be tenderized; vertically movable carrier support members at opposite sides of said conveyor; a knife carriage above said conveyor and having a multiplicity of closely spaced vertically aligned apertures; means for selectively connecting said knife carriage to said carrier support members in one of different angular positions about a horizontal axis above said conveyor and extending transversely thereof; a rod member slidable in each of a plurality of the aligned apertures of said first carriage and operatively connected thereto by an overload release means; a long thin tenderizing knife connected to a lower end of each of said rod members; power means for reciprocating said carriage support members to cause said knives to pierce a product therebelow on said conveyor; a stripper carriage arranged to move downwardly and upwardly in coordination with like movements of said knife carriage; a stripper plate overlying said conveyor and have apertures therein through which said knives may extend detachably connected to said stripper carriage to rest upon the upper surface of a product being pierced; and means for locking said stripper carriage in position with said stripper plate resting upon the product while said knives are being withdrawn from a product.

3. An apparatus for tenderizing a comestible product, and/or meat comprising: an intermittently advanced horizontal conveyor for supporting and conveying thereon a product to be processed; vertically movable carriage support members at opposite sides of said conveyor; a knife carriage above said conveyor having a plurality of plate-like members orientated generally normal to the direction of movement of said carriage support members and fixed in spaced relation one above another and provided with a multiplicity of closely spaced aligned apertures; means for selectively connecting said knife carriage to said carrier support members in one of different angular positions about a horizontal axis above said conveyor and extending transversely thereof; a rod member slidable in each of a plurality of aligned apertures of a plurality of said plate-like members and extending to opposite sides thereof and each having flange means at the upper side of an intermediate one of said plate-like members normally engaging the same; a discrete compression spring surrounding each of the rod members and interposed between said flange means thereon and the under side of one of said plate-like member thereabove; a downwardly directed long thin tenderizing knife connected to the lower end of each of said rod members and extending through individual apertures in the lower one of said plate-like member; power means for reciprocating said carriage support members to cause said knives to pierce a product therebelow on said conveyor; a stripper carriage arranged to move downwardly and upwardly in coordination with like movements of said knife carriage; a stripper plate overlying said conveyor and having apertures therein through which said knives may extend detachably connected to said stripper carriage to rest upon the upper surface of a product being pierced; and means for locking said stripper carriage in position with said stripper plate resting upon a product while said knives are being withdrawn from a product.

* * * * *